United States Patent [19]

Yokoo et al.

[11] 4,319,078
[45] Mar. 9, 1982

[54] APPARATUS FOR DETECTING X AND Y COORDINATES OF INPUT POINTS

[75] Inventors: Kenta Yokoo, Yokohama; Tomio Kishimoto; Yuichi Sato, both of Yokosuka, all of Japan

[73] Assignee: Nippon Telegraph & Telephone Public Corporation, Tokyo, Japan

[21] Appl. No.: 129,363

[22] Filed: Mar. 11, 1980

[30] Foreign Application Priority Data

Apr. 2, 1979 [JP] Japan .................................. 54-38410
Dec. 18, 1979 [JP] Japan ................................ 54-163614

[51] Int. Cl.³ .......................................... G08C 21/00
[52] U.S. Cl. ................................... 178/18; 340/365 A
[58] Field of Search ............................ 178/18, 19, 20; 340/365 P, 365 R, 365 A, 365 E, 146.3 SY; 33/1 M; 346/139 C

[56] References Cited

U.S. PATENT DOCUMENTS 4,013,835 3/1977 Eachus et al. ........................ 178/18

FOREIGN PATENT DOCUMENTS 1539755 1/1979 United Kingdom .................. 178/18

OTHER PUBLICATIONS

"Pressure Controlled Resistance Matrix", Einolf et al, IBM Technical Disclosure Bulletin, vol. No. 6, No. 3, Aug. 1963, pp. 4 and 5.

Primary Examiner—Thomas A. Robinson
Attorney, Agent, or Firm—Blakely, Sokoloff, Taylor & Zafman

[57] ABSTRACT

The input surface of the apparatus for detecting X and Y coordinates of the input points comprises a first parallel electrode group, a second flexible parallel electrode group opposing and intersecting the first parallel electrode group. A pressure conductive rubber sheet which becomes conductive when the pressure is applied to the input surface is interposed between the two electrode groups. First and second resistors are provided which are in electrical contact with terminal ends of the two electrode groups. Electric signals from the first and second resistors are used to detect X and Y coordinates of input points on the input surface.

10 Claims, 9 Drawing Figures

APPARATUS FOR DETECTING X AND Y COORDINATES OF INPUT POINTS

BACKGROUND OF THE INVENTION

The present invention generally relates to apparatus for detecting X and Y coordinates of input points, and more particularly to apparatus for detecting X and Y coordinates of input points of handwritten characters and figures.

In the prior art, the input apparatus for handwritten characters and figures called tablets or digitizers are known. Such an apparatus includes a plurality of electrodes parallel to X and Y axes and these X and Y electrodes are coupled capacitively, magnetically or physically at an input point designated by an electric pen or a stylus, thereby the input point being detected electrically or magnetically.

In an apparatus disclosed in U.S. Pat. No. 2,907,824 to Robert Lee Peek, Jr. entitled "Electrographic Transmitter", electrically conductive wires, intersecting each other at right angles, are supported under tension, the lower wires being of a magnetic material and the upper wires of a non-magnetic material. When figures are drawn with a stylus provided with a permanent magnet, the lower magnetic wire is brought into contact with the upper wire corresponding to the locus of the stylus by the magnetic attraction, thereby generating a voltage proportional to the position of the stylus or the input point. By detecting the voltage, one learns the position of the input point. However, the prior art apparatus was seriously defective in that the stylus had to be provided with a permanent magnet at its end and an ordinary writing tool could not be used. Further, since the lower wire had to be of a magnetic material, ordinary lead wire could not be used, and the material and tension thereof needed to be selective quite severely in order to respond to the attraction of the stylus magnet. Thus, the structure became quite complex and the fine adjustment had to be made, making the whole apparatus impractical.

Of the other examples of the conventional type apparatus, one disclosed in U.S. Pat. No. 3,304,612 to Ronald R. Proctro et al has upper and lower groups of input electrodes whereby the upper group includes conductors which extend within a plurality of grooves formed in a flexible, resilient, non-conductive member and a flexible conductive sheet therebeneath mates with the non-conductive member. The lower group is of a similar structure, and the two groups of electrodes are laminated in such a way that respective conductors in the grooves of the upper electrode group intersect the respective conductors in the grooves of the lower electrode group. There are resistors connected between adjacent conductors to divide the voltage of the power source. The X and Y coordinates of a point at which the conductor and the conductive sheet in the upper and lower electrode groups are brought into contact with each other under the application of pressure can be determined by measuring the divided voltage.

In the latter conventional apparatus, it is possible to use ordinary writing tools for inputting data. However, the input surface responds to any kind of pressures other than that by the tools, for instance, the pressure of the operator's hand caused as he accidentally leans on the surface. Thus it is seriously defective in that the apparatus cannot be used with the input surface positioned horizontally. Moreover, since the conductors are applied in the grooves of a flexible insulator and the fine pitches between the grooves are difficult to determine, it is extremely difficult to achieve a high resolution. As it is extremely difficult to form such grooves with a constant pitch and over a long distance, it is practically difficult to manufacture apparatus having a large area for the input surface. In addition, the fact that both the upper and lower groups of electrodes require conductive sheets in addition to the conductors complicates the structure of the apparatus.

SUMMARY OF THE INVENTION

The present invention contemplates to remove the defects as mentioned above of the prior art apparatus and it has for its object to provide an apparatus for detecting X and Y coordinates of the input points which can facilitate hand-writing of characters and figures with ordinary writing tools and which can be used in a horizontal position.

To attain the above object, according to the invention, in an apparatus for detecting X and Y coordinates of input points comprising an input surface including a first parallel electrode group and a second, flexible parallel electrode group opposing and intersecting the first parallel electrode group, a first resistor being in electrical contact with electrode conductors of the first parallel electrode group at one end thereof, a second resistor being in electrical contact with electrode conductors of the second parallel electrode group at one end thereof, and electrical detection means for detecting the input position on the input surface by using electrical signals generated from the first and second resistors, the improvement which comprises a pressure conductive rubber sheet interposed between the first and second parallel electrode groups, the sheet being rendered conductive upon application of pressure to the input surface, and means provided in the electrical detection means, for detecting currents flowing through the first and second resistors.

DESCRIPTION OF PREFERRED EMBODIMENTS

A preferred embodiment of the present invention will be described with reference to FIGS. 1 and 2, in which reference number 1 denotes a rigid base sheet, 2 a first group of parallel electrodes comprising a plurality of conductors $Y_0, Y_1 \ldots, Y_n$ provided in parallel on the surface of a non-flexible insulating substrate 11, 3 a second group of parallel electrodes comprising a plurality of conductors $X_0, X_1 \ldots, X_n$ provided in parallel on the back of a flexible insulating substrate 10, the groups of parallel electrodes 2 and 3 being opposedly positioned in such a way that their conductors intersect (at right angles in an example shown) with each other in the area of the input surface W of the insulating substrate 10 and sandwich a pressure conductive rubber sheet 12. Reference number 4 denotes a first resistor in the form of a sheet which is in contact with one end of the parallel electrode group 2, 5 a second resistor also in the form of a sheet which is in contact with one end of the parallel electrode group 3, 6 and 7 terminals provided at the opposite end surfaces of the resistor 4 in its longitudinal direction, 8 and 9 terminal electrodes provided at the opposite end surfaces of the resistor 5 in its longitudinal direction, and a, b, c and d lead terminals connected respectively to the terminals 6, 7, 8 and 9.

These resistors 4 and 5 are made of resistive sheet or metal film resistors formed on a substrate such as a glass. Reference number 13 also denotes a pressure conductive rubber sheet which is provided between the parallel electrode group 2 and the resistor 4 for electrical connection therebetween. Similarly, reference number 14 denotes a pressure conductive rubber sheet provided between the parallel electrode group 3 and the resistor 5 for electrical connection therebetween. The pressure conductive rubber sheet described herein is available from CHOMERICS, Inc., USA, Japan Synthetic Rubber Co., Ltd., etc. and is normally considered as an insulating material, but when pressure is applied, it becomes conductive because the resistance at the force applied portion becomes greatly lowered. Accordingly, the pressure conductive rubber sheets 13 and 14 are sandwiched by the electrode group 2 and the resistor 4 and by the electrode group 3 and the resistor 5, respectively, at a constant and predetermined pressure, thereby securing the electrical connection therebetween. Obviously, such a preload is by no means applied on the pressure conductive rubber sheet 12.

Figure 3:
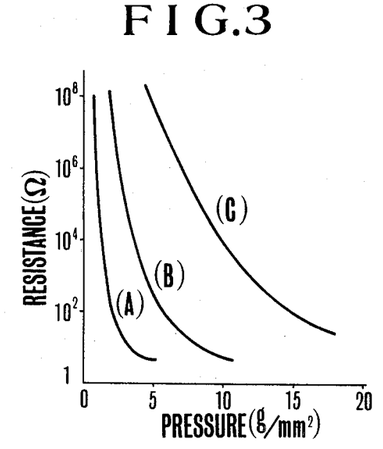
FIG. 3 is a graph showing the relation between resistance and pressure in a pressure conductive rubber sheet.

FIG. 3 is a graph showing the relation between pressure per unit area (1 mm$^2$) in the pressure conductive rubber sheet and resistance per unit area. Curves (A), (B) and (C) correspond to characteristics of pressure conductive rubber sheets of different specifications.

Accordingly, when characters and figures are drawn on the input surface W using a writing tool, a pressure is applied to the pressure conductive sheet 12 via the flexible insulating substrate 10 and the parallel electrode group 3, and the force applied points become conductive and the respective conductors of the parallel electrode groups 2 and 3 at these points become electrically contacted. In this embodiment, it was confirmed that the resistance between the parallel electrode groups 2 and 3 are lowered from 100 K ohms to several ohms when a pressure of about 70 g/mm$^2$ is applied.

Although not shown in the drawings, the resistor 4 and the insulating substrate 11, and the resistor 5 and the insulating substrate 10 are pressed together by a clamper at a predetermined pressure. Thus, as mentioned above, the resistance of the pressure conductive rubber sheets 13 and 14 becomes sufficiently lowered and they become conductive and come in intimate contact, by the elasticity of rubber, with the resistor and the electrode conductor so that the electrical connection between the parallel electrode group 2 and the resistor 4 and that between the parallel electrode group 3 and the resistor 5 can be excellently and stably ensured.

One example of structural dimensions for the electrode group is shown below. The pitch between electrode conductors is sufficiently small and a high resolution is obtainable. The electrode conductor is also sufficiently long for the fabrication of the input surface of a large area.

In an example of high resolution input apparatus, copper foil electrode conductors plated with gold and having 0.175 mm width, 5–3.5 $\mu$m thickness and 20 cm length are arranged at a pitch of 0.25 mm and a polyimide substrate is used. In another example, copper foil electrode conductors plated with gold and having 0.7 mm width, 5–3.5 $\mu$m thickness and 1.5 m length are arranged at a pitch of 1 mm and a polyimide substrate is used. These electrode groups have the identical material and structure to that of the conventional flat cable. When the conductors are arranged at P mm pitch, the resolution of the input apparatus can be 1/P (number/mm).

The circuit operation to detect the coordinates at contact point P when the pressure is applied upon the input surface W will now be explained.

Figure 4A:
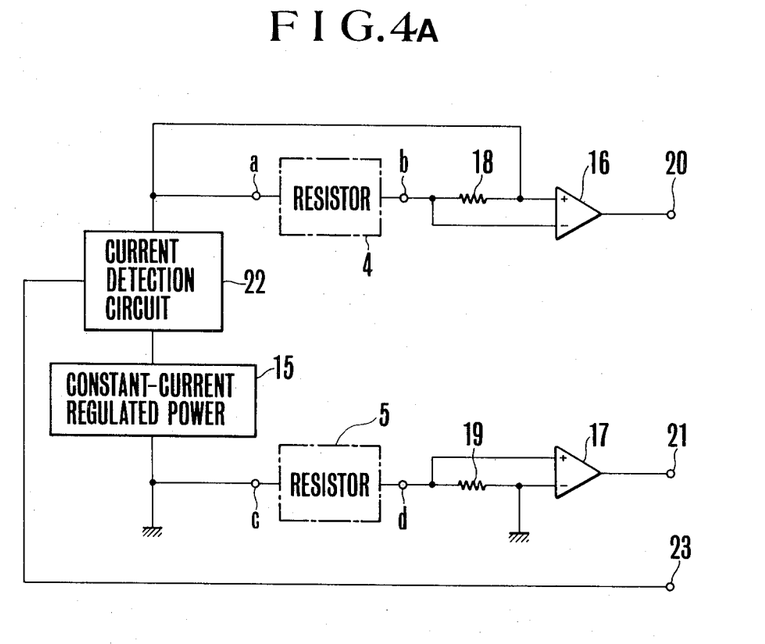
FIG. 4A is a connection diagram showing one embodiment of a circuit construction for a point detection circuit of the present invention.
Figure 5:
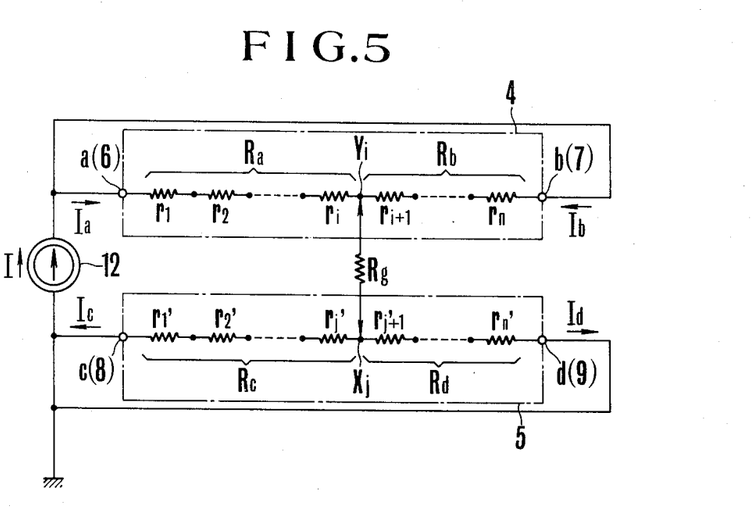
FIG. 5 is an eqivalent circuit of the point detection circuit.

FIG. 4A is a diagram showing a point detection and FIG. 5 an equivalent circuit of the detection circuit. In the figures, the identical parts to those in FIG. 1 are designated by the identical reference numbers. In FIG. 4A, reference number 15 denotes a source of constant-current regulated power, 16 and 17 operational amplifiers, 18 and 19 resistors having sufficiently small resistance as compared to the input impedance of the operational amplifiers 16 and 17, 20 an X output terminal, 21 a Y output terminal, 22 a current detection circuit comprising an operational amplifier, etc. and 23 a touch output terminal from which a signal responsive to contact of the writing tool with the input surface is delivered.

Figure 1:
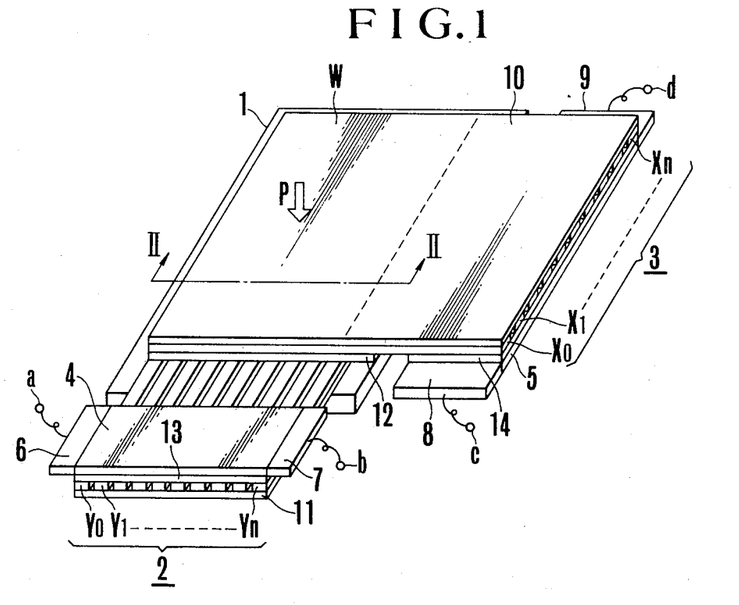
FIG. 1 is a perspective view of one embodiment of the apparatus for detecting X and Y coordinates of input points in accordance with the present invention.
Figure 2:
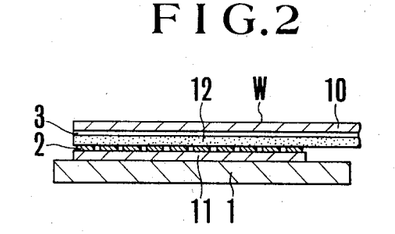
FIG. 2 is a cross sectional view taken along line II—II of FIG. 1.

In operation, conductors of the parallel electrode groups 2 and 3 are contacted electrically at the input point P by applying the pressure on the input surface W shown in FIG. 1 and the resistors 4 and 5 are coupled at the corresponding point. In other words, the pressure conductive rubber sheet 12 becomes conductive at the point P by the force applied, and electrode conductors of the parallel electrode groups 2 and 3 intersecting perpendicularly at this point are electrically contacted to form an equivalent circuit as shown in FIG. 5. In FIG. 5, $r_i$ (i = 1, 2, ... n) is a resistance of the resistor 4 located between electrode conductor $y_i$ corresponding to the contact point P and adjacent electrode conductor $Y_{i-1}$ of the parallel electrode group 2, and $r'_j$ (j = 1, 2, ... n) is a resistance of the resistor 5 located between electrode conductor $X_j$ corresponding to the contact point P and adjacent electrode conductor $X_{j-1}$ of the parallel electrode group 3. Ra is a resistance of the resistor 4 between the terminal electrode 6 and the electrode conductor $Y_i$ passing through the contact point P, $R_b$ is a resistance of the resistor 4 between the terminal electrode 7 and the electrode conductor $Y_i$, $R_c$ is a resistance of the resistor 5 between the terminal electrode 8 and the electrode conductor $X_j$ passing through the contact point P, $R_d$ is a resistance of the resistor 5 between the terminal electrode 9 and the electrode conductor $X_j$, and $R_g$ is a resistance of the pressure conductive rubber sheet 12 having a small resistance value at the contact point P which is regarded as negligible in the following calculations. Symbol I denotes a current flowing from the constant-current regulated power 12, $I_a$, $I_b$ are currents respectively flowing into terminals a, b, and $I_c$ and $I_d$ currents respectively flowing out from the terminals c, d.

When the electrode conductor $Y_i$ of the parallel electrode group 2 and the electrode conductor $X_j$ of the parallel electrode group 3 come in electrical contact with each other at the contact point P, the following equations hold.

$$R_a = r_1 + r_2 + \ldots + r_i \quad (1)$$

$$R_b = r_{i+1} + r_{i+2} + \ldots + r_n \quad (2)$$

$$R_c = r'_1 + r'_2 + \ldots + r'_j \quad (3)$$

$$R_d = r'_{j+1} + r'_{j+2} + \ldots + r'_n \quad (4)$$

If the resistance between the terminal electrodes 6 and 7 of the resistor 4 and that between the terminal electrodes 8 and 9 of the resistor 5 are equal and uniform and electrode conductors of the parallel electrode groups 2 and 3 are equally spaced, then the following equation holds;

$$r_0 = r_i = r'_j$$

and equations (1) to (4) respectively reduce to, $$R_a = i \times r_0 \quad (5)$$

$$R_b = (n-i) \times r_0 \quad (6)$$

$$R_c = j \times r_0 \quad (7)$$

$$R_d = (n-j) \times r_0 \quad (8)$$

On the other hand, the current is expressed by, $$I = I_a + I_b = I_c + I_d \quad (9)$$

The relation among $R_a$ and $R_b$ and $I_a$ and $I_b$ is expressed by, $$I_a R_a = I_b R_b \quad (10)$$

When equations (5) and (6) are substituted into equation (10), then $$I_a i r_0 = I_b (n-i) r_0 \quad (11)$$

$$i = n/I \, I_b \quad (12)$$

stand.

In equation (12), I and n are constant and therefore i can be determined by measuring $I_b$ and the electrode conductor $Y_i$ can be detected.

Similarly, the following equation represents the relation among $R_c$, $R_d$, $I_c$ and $I_d$.

$$I_c R_c = I_d R_d \quad (13)$$

When equations (7) and (8) are substituted into equation (13), the following equations hold.

$$I_c j r_0 = I_d (n-j) r_0 \quad (14)$$

$$j = n/I \, I_d \quad (15)$$

In equation (15), I and n are constant and therefore j can be determined by measuring $I_d$ and the electrode conductor $X_j$ can be detected.

Thus, the coordinates of the input contact point P uon which the pressure is being applied can be detected.

In FIG. 4A, voltage drops caused by the currents $I_b$, $I_d$ flowing respectively through the resistors 18 and 19 are amplified by the operational amplifiers 16 and 17 to obtain output voltages at the X output terminal 20 and Y output terminal 21 corresponding to X and Y coordinates of the input contact point P.

Figure 4B:
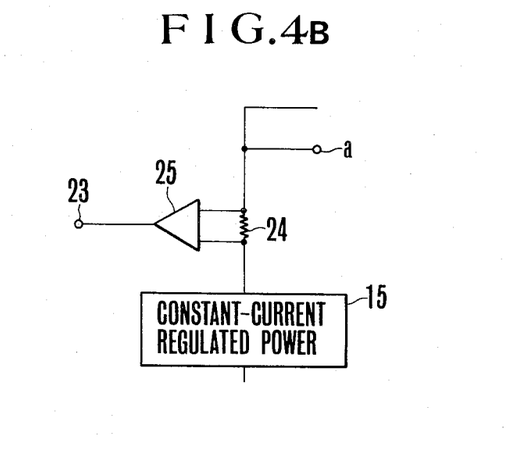
FIG. 4B is a diagram showing one example of a current detection circuit of FIG. 4A.

On the other hand, with no pressure applied, the resistance $R_g$ between the electrode conductors $Y_i$ and $X_j$ becomes sufficiently large to disconnect these conductors, thereby preventing the current I from flowing. Accordingly, when as shown in FIG. 4A, the current I is detected by the current detection circuit 22 connected in series with the constant-current regulated power 15, the touch of the writing tool can be detected by an output from the touch output terminal 23. The current detection circuit 22 is, for example, comprised of a resistor 24 and a comparator 25 as shown in FIG. 4B.

According to the input position detection apparatus as described above, since there is no need to apply tension to the second parallel electrode group because of the pressure conductive rubber sheet interposed between the parallel electrode groups, the structure is simplified and the cost is decreased. This also eliminates the problem of accidental mutual contact of the electrode conductors even when the electrode groups are incorporated in an apparatus of a relatively large input surface and are used in horizontal position. The larger area does not necessarily increase cost, and it becomes extremely easy to increase the size of the apparatus.

When the pressure conductive rubber sheet is used which has such a property as the pressure required to make the sheet conductive increases as the area upon which the force is applied increases, i.e, the property of pressure dependency, the pressure conductive rubber sheet will not become conductive even if the input surface is pressed accidentally with fingers and/or hand of the operator so that erroneous detection can be eliminated.

Figure 6:
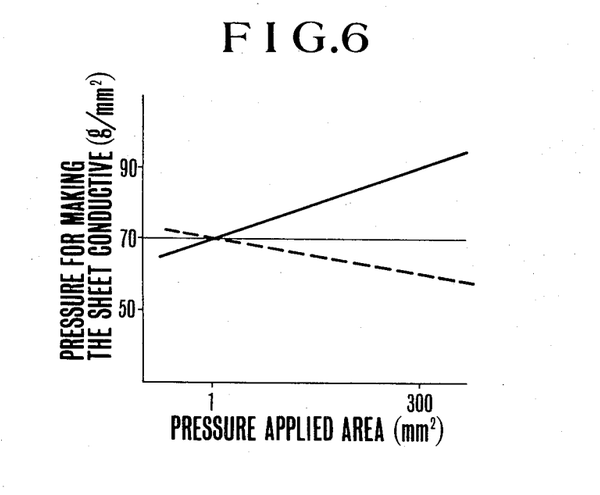
FIG. 6 is a graph showing the relation between force applied area for the pressure conductive rubber sheet having the pressure dependency property and pressure required to make the same conductive.

FIG. 6 shows a graph showing the relation between pressure applied area in the pressure conductive rubber sheet having the pressure dependency and pressure required to make the same conductive. What is meant herein by "becoming conductive" means that the resistance of the pressure conductive rubber sheet becomes several ohms and the pressure is the force applied per unit area. In the figure, the dotted line represents a characteristic of a conventional pressure conductive sheet which exhibits negative pressure dependency.

As will be seen from FIG. 6, the conventional pressure conductive sheet shows a trend wherein the force required for making the sheet conductive decreases as the area to which the force is applied increases, whereas in the pressure conductive rubber sheet of this invention having the pressure dependency, the necessary force increases as the area to which the force is applied increases. Accordingly, even in the event that a portion of the input surface is pressed by fingers and/or hand exceeding the contact area of the writing tool, the pressure conductive rubber sheet is inhibited from becoming conductive. As a result, the input effected only by the pressure of the writing tool having a sharp point can advantageously be detected. Thus, even if the operator uses the writing tool by manipulating it on the input surface which is positioned horizontally with his hand and/or fingers placed upon the same surface, the input by the pressure of the writing tool alone will be detected. The contact area of the hand and the fingers in the ordinary circumstances is about 1800 mm$^2$ and the contact pressure thereof is about 1260 g. Accordingly, the force applied per unit area is about 0.7 g/mm$^2$ which is far smaller than the pressure required to make the same area conductive.

In the foregoing embodiment, the parallel electrode groups are in contact with the whole length of the first and second resistors, but they may partly be in contact with the resistors. The resistor and the electrode conductor may be soldered together without resort to the electrical connection by the pressure conductive rubber sheet. Different resistances per unit length of the first and second resistors may achieve the same results as is clear from the equivalent circuit.

It is not always necessary that the first and second parallel electrode groups mutually intersect at right angles, but they may be in an inclined position. Although the insulating substrate having flexibility is used as an input surface, it is possible to place a flexible protective film on the input surface as the need arises.

Figure 7:
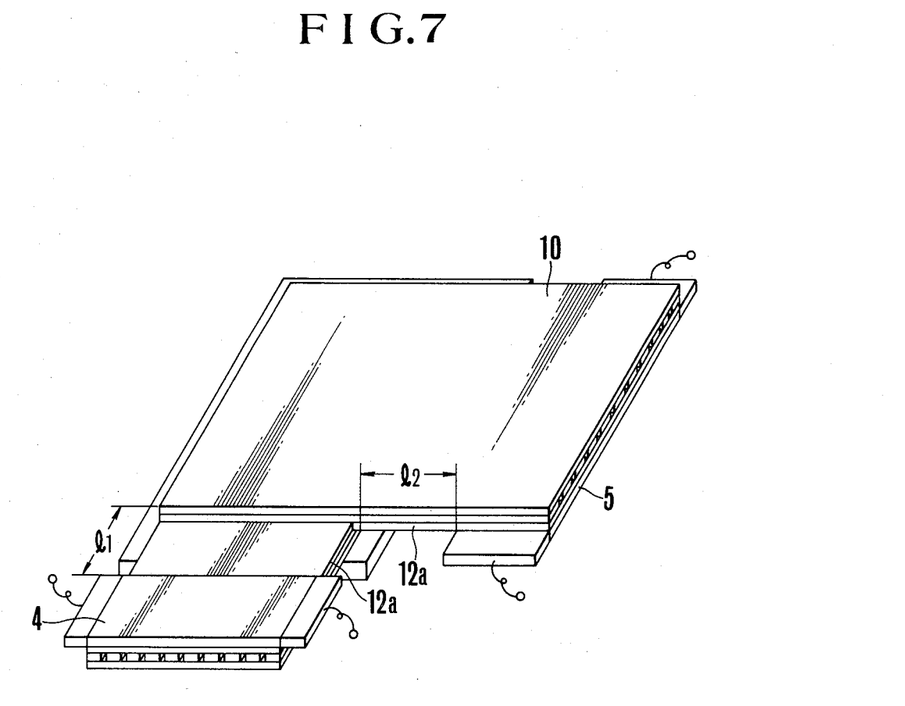
FIG. 7 is a perspective view of another embodiment of the detection circuit for X and Y coordinates of input points in accordance with the present invention.

Referring to FIG. 7, there is shown another embodiment of the present invention. In the foregoing embodiment, the pressure conductive rubber sheet 12 for the input surface is separated from the pressure conductive rubber sheets 13 and 14 which are adapted to ensure electrical connection between the electrode conductor and the resistor region. However, when spacings $l_1$ and $l_2$ between the input surface region and the resistor region are not so large as to cause the sheet deformation at the resistor region, which is due to the compressive force applied to clamp the insulating substrate and resistor, to affect the sheet at the input surface region, an integral pressure conductive rubber sheet 12a can be used for the input surface and the resistors. Obviously, if only one of the spacings is sufficiently large, the integration may be effected accordingly.

Figure 8:
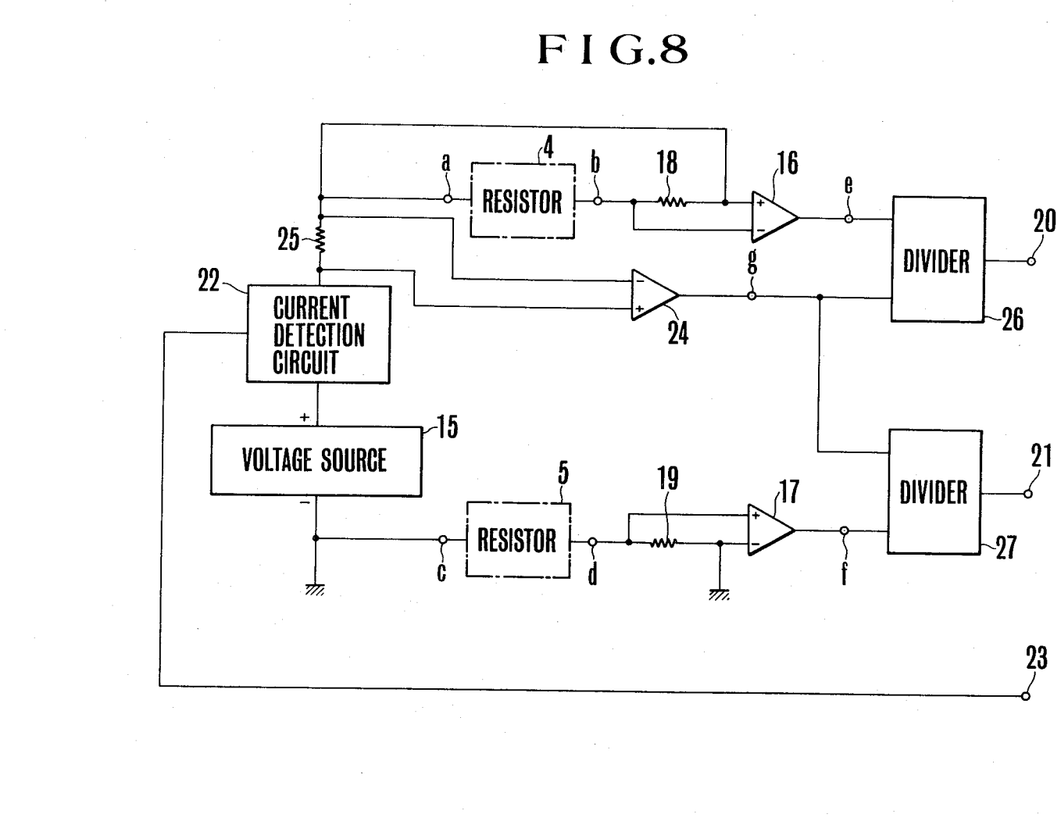
FIG. 8 is a connection diagram showing a modified point detection circuit.

In the position detection circuit of FIG. 4A, the constant-current regulated power is used, but a voltage source may be used for driving as shown in FIG. 8. In this case, an adder circuit for computing $(I_a+I_b)$ or $(I_c+I_d)$ of FIG. 5 and a divider circuit for computing $I_b/(I_a+I_b)$ and $I_d/(I_c+I_d)$ may be used to obtain the same result. More particularly, a voltage source 22 of voltage E is used in FIG. 8 instead of the constant-current regulated power 15 shown in FIG. 4, and a fixed resistor 25, an amplifier 24 of high input impedance, and a divider 26 to compute $I_b/I$, and a divider 27 to compute $I_d/I$ are added with the remaining portions being the same as those in FIG. 4. In FIG. 8, voltage proportional to current $I_b$ is obtained at a terminal e, voltage proportional to current $I_d$ at a terminal f, and voltage proportional to current $I (=I_a+I_b=I_c+I_d)$ at a terminal g.

In FIG. 8, an equivalent circuit when receiving the input is obtained by replacing the constant-current regulated power 12 of FIG. 5 with the voltage source generating voltage E.

In this case, equations (1) to (12) hold as in the case when the constant-current regulated power is used. Therefore, i which represents the electrode conductor $X_i$ corresponding to the input point is expressed by the following equation.

$$i = \frac{n}{I} I_b = \frac{n}{I_a+I_b} I_b \tag{16}$$

where current I is, $$I = \frac{E}{\frac{R_a \cdot R_b}{R_a+R_b} \cdot R_e \cdot \frac{R_c \cdot R_d}{R_c+R_d}} \tag{17}$$

As is clear from equation (17), the current I varies with change in $R_a$, $R_b$, $R_c$, $R_d$ and $R_e$ values, and also with change in the voltage E. Accordingly, it is necessary to calculate $I_b/I$ in order to determine i. Similarly, j representing the electrode conductor $Y_j$ corresponding to the input point may be determined by calculating $I_d/I$ in equation (15).

According to the apparatus for detecting X and Y coordinates of input points of the present invention, the structure of the input surface can extremely be simplified, thereby decreasing the costs, and erroneous detection due to hand and/or finger pressure can be eliminated. The stable input operation becomes feasible even if the input surface is positioned horizontally and the input area can be enlarged quite easily without raising the cost. The easy input operation is possible with an ordinary writing tool. The pressure conductive rubber sheet is not sensitive to the force applied upon a relatively large area such as by fingers and/or hand, and it can detect only the force applied upon small area alone such as by the writing tool. It becomes thus possible to operate the apparatus by holding the input surface with fingers and/or hands. The present invention, therefore, is advantageous in many points.

What is claimed is:

1. In an apparatus for detecting X and Y coordinates of input points comprising an input surface including a first parallel electrode group and a second, flexible parallel electrode group opposing and intersecting the first parallel electrode group, a first resistor being in electrical contact with electrode conductors of the first parallel electrode group at one end thereof, a second resistor being in electrical contact with electrode conductors of the second parallel electrde group at one end thereof, and electrical detection means for detecting the input position on the input surface by using electrical signals generated from the first and second resistors, the improvement which comprises a pressure conductive rubber sheet interposed between the first and second parallel electrode groups, said sheet being rendered conductive upon application of pressure to the input surface, and means provided in said electrical detection means for detecting currents flowing through said first and said second resistors, whereby said X and Y coordinates of input points are detected by measuring said currents flowing through said first and second resistors.

2. Apparatus according to claim 1 wherein the pressure required to make said pressure conductive rubber sheet conductive is dependent on the area over which the pressure is applied.

3. Apparatus according to claim 1 wherein the first parallel electrode group is provided on a non-flexible insulating substrate, and the second parallel electrode group extends across a flexible insulating substrate.

4. Apparatus according to claim 1 wherein said electrical detecting means comprise a source of constant-current regulated power connected to supply a predetermined current to one of the first and second resistors and to receive the predetermined current from the other, resistor elements inserted in the current paths of the two resistors, and operational amplifiers which amplify voltage drops across said resistor elements.

5. Apparatus according to claim 4 which comprises a current detection circuit connected in series with the source of constant-current regulated power.

6. Apparatus according to claim 1 which comprises a pressure conductive rubber sheet connector interposed between the parallel electrode groups and the resistors and clamped under a predetermined pressure.

7. Apparatus according to claim 6 wherein said pressure conductive rubber is integral with said sheet connector.

8. Apparatus according to claim 1 wherein the resistor comprises a metal foil resistor formed on a substrate.

9. Apparatus according to claim 1 wherein a flexible protective film is provided on the input surfaces.

10. Apparatus according to claim 1 wherein said electrical detecting means comprises a voltage source connected between said first and second resistors, first resistor elements inserted in the current paths of the two resistors, operational amplifiers which amplify voltage drops across said first resistor elements, a second resistor element inserted between the voltage source and one of the first and second resistors, a high input impedance amplifier connected to detect voltage drop across the second resistor element, a first divider having one input connected to the output of one of the operational amplifiers and the other input connected to the output of the high input impedance amplifier, and a second divider having one input connected to the output of the other of the operational amplifiers and the other input connected to the output of the high input impedance amplifier.

* * * * *